(12) United States Patent
Cho et al.

(10) Patent No.: US 8,475,027 B2
(45) Date of Patent: Jul. 2, 2013

(54) BACKLIGHT ASSEMBLY AND DISPLAY DEVICE HAVING THE SAME

(75) Inventors: Joo-Woan Cho, Asan-si (KR); Yong-Woo Lee, Suwon-si (KR); Hyoung-Joo Kim, Anyang-si (KR)

(73) Assignee: Samsung Display Co., Ltd. (KR)

( * ) Notice: Subject to any disclaimer, the term of this patent is extended or adjusted under 35 U.S.C. 154(b) by 149 days.

(21) Appl. No.: 12/981,598

(22) Filed: Dec. 30, 2010

(65) Prior Publication Data

US 2011/0188263 A1     Aug. 4, 2011

(30) Foreign Application Priority Data

Jan. 29, 2010 (KR) .................. 10-2010-0008500

(51) Int. Cl.
*F21V 7/04* (2006.01)

(52) U.S. Cl.
USPC ............ 362/606; 362/632; 362/633; 362/634

(58) Field of Classification Search
USPC ................................ 362/632–634
See application file for complete search history.

(56) References Cited

U.S. PATENT DOCUMENTS

| 6,305,812 | B1 * | 10/2001 | Kim et al. | 362/632 |
| 7,334,935 | B1 * | 2/2008 | Chen et al. | 362/633 |
| 2008/0111950 | A1 * | 5/2008 | Hong | 349/65 |
| 2009/0262554 | A1 * | 10/2009 | Lee et al. | 362/633 |
| 2010/0208492 | A1 * | 8/2010 | Sugie et al. | 362/606 |

FOREIGN PATENT DOCUMENTS

WO    WO 2009066531 A1 *  5/2009

* cited by examiner

*Primary Examiner* — David J Makiya
(74) *Attorney, Agent, or Firm* — Cantor Colburn LLP (57) ABSTRACT

Provided are a backlight assembly and a display device having the same. The backlight assembly includes; a light guide plate ("LGP") having a light incident portion upon which light is incident and an opposite portion which is disposed substantially opposite to the light incident portion, a lower housing which accommodates the LGP therein, and at least one LGP fixing tape which fixes the LGP into the lower housing, wherein the at least one LGP fixing tape is interposed between the lower housing and lower surfaces of two opposite ends of the light incident portion of the LGP.

17 Claims, 11 Drawing Sheets

BACKLIGHT ASSEMBLY AND DISPLAY DEVICE HAVING THE SAME

This application claims priority to Korean Patent Application No. 10-2010-0008500, filed on Jan. 29, 2010, and all the benefits accruing therefrom under 35 U.S.C. §119, the content of which in its entirety is herein incorporated by reference.

BACKGROUND OF THE INVENTION

1. Field of the Invention

The present invention relates to a backlight assembly and a display device having the same, and more particularly, to a backlight assembly which is structured to be assembled easily and a display device having the backlight assembly.

2. Description of the Related Art

Liquid crystal displays ("LCDs") are one of the most widely used types of flat panel displays ("FPDs"). Generally, an LCD includes a pair of opposing substrates, each having electrodes disposed thereon, and a liquid crystal layer interposed between the two substrates. In a typical LCD, voltages are applied to electrodes to generate an electric field. The electric field determines the alignment of liquid crystal molecules of a liquid crystal layer, thereby controlling the amount of light that passes through the liquid crystal layer. As a result, a desired image is displayed on the LCD.

Since liquid crystal molecules cannot emit light by themselves, they need a backlight assembly including light sources, i.e., light-emitting elements, in order to display an image. There are many different types of light sources for use in an LCD, of which backlight assemblies typically provide the most uniformly distributed light to the entire surface of a display panel from behind the display panel. Backlight assemblies are classified into direct-type backlight assemblies and edge-type backlight assemblies according to the position of light sources which emit light. A direct-type backlight assembly includes light sources disposed directly under a display panel. On the other hand, an edge-type backlight assembly includes light sources disposed at one or more sides of a display panel, and light emitted from the light sources is delivered to the entire surface of the display panel using a light guide plate.

BRIEF SUMMARY OF THE INVENTION

Aspects of the present invention provide a backlight assembly which is structured to be assembled easily.

Aspects of the present invention also provide a display device having a backlight assembly which is structured to be assembled easily.

However, aspects of the present invention are not restricted to the ones set forth herein. The above and other aspects of the present invention will become more apparent to one of ordinary skill in the art to which the present invention pertains by referencing the detailed description of the present invention given below.

According to an aspect of the present invention, there is provided an exemplary embodiment of a backlight assembly including; a light guide plate ("LGP") having a light incident portion upon which light is incident and an opposite portion which is disposed substantially opposite to the light incident portion, a lower housing which accommodates the LGP therein, and at least one LGP fixing tape which fixes the LGP into the lower housing, wherein the at least one LGP fixing tape is interposed between the lower housing and lower surfaces of opposing ends of the light incident portion of the LGP.

According to another aspect of the present invention, there is provided a backlight assembly including; a light source unit having a circuit board and at least one light source element mounted on the circuit board, at least one LGP fixing tape disposed at opposing ends of the light source unit, and an LGP disposed adjacent to the at least one light source element on the circuit board and which guides light emitted from the at least one light source element, wherein part of the LGP is adhered to at least part of the at least one LGP fixing tape.

According to another aspect of the present invention, there is provided a display device including; an LGP having a light incident portion upon which light is incident and an opposite portion which is disposed substantially opposite to the light incident portion, a lower housing which accommodates the LGP therein, a backlight assembly having at least one LGP fixing tape which fixes the LGP into the lower housing, and a display panel which receives light from the backlight assembly and thus displays image information, wherein the at least one LGP fixing tape is interposed between the lower housing and lower surfaces of opposing ends of the light incident portion of the LGP.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE INVENTION

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "below," "beneath," "lower," "above," "upper," and the like, may be used herein for ease of description to describe one device or element's relationship to another device(s) or element(s) as illustrated in the drawings. It will be understood that the spatially relative terms are intended to encompass different orientations of the device in use or operation in addition to the orientation depicted in the drawings. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Embodiments of the invention are described herein with reference to (plan and) cross-section illustrations that are schematic illustrations of idealized embodiments of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be described in detail with reference to the accompanying drawings.

Hereinafter, an exemplary embodiment of a backlight assembly and a display device having the same according to the present invention will be described in detail with reference to FIGS. 1 through 11B.

Figure 1:
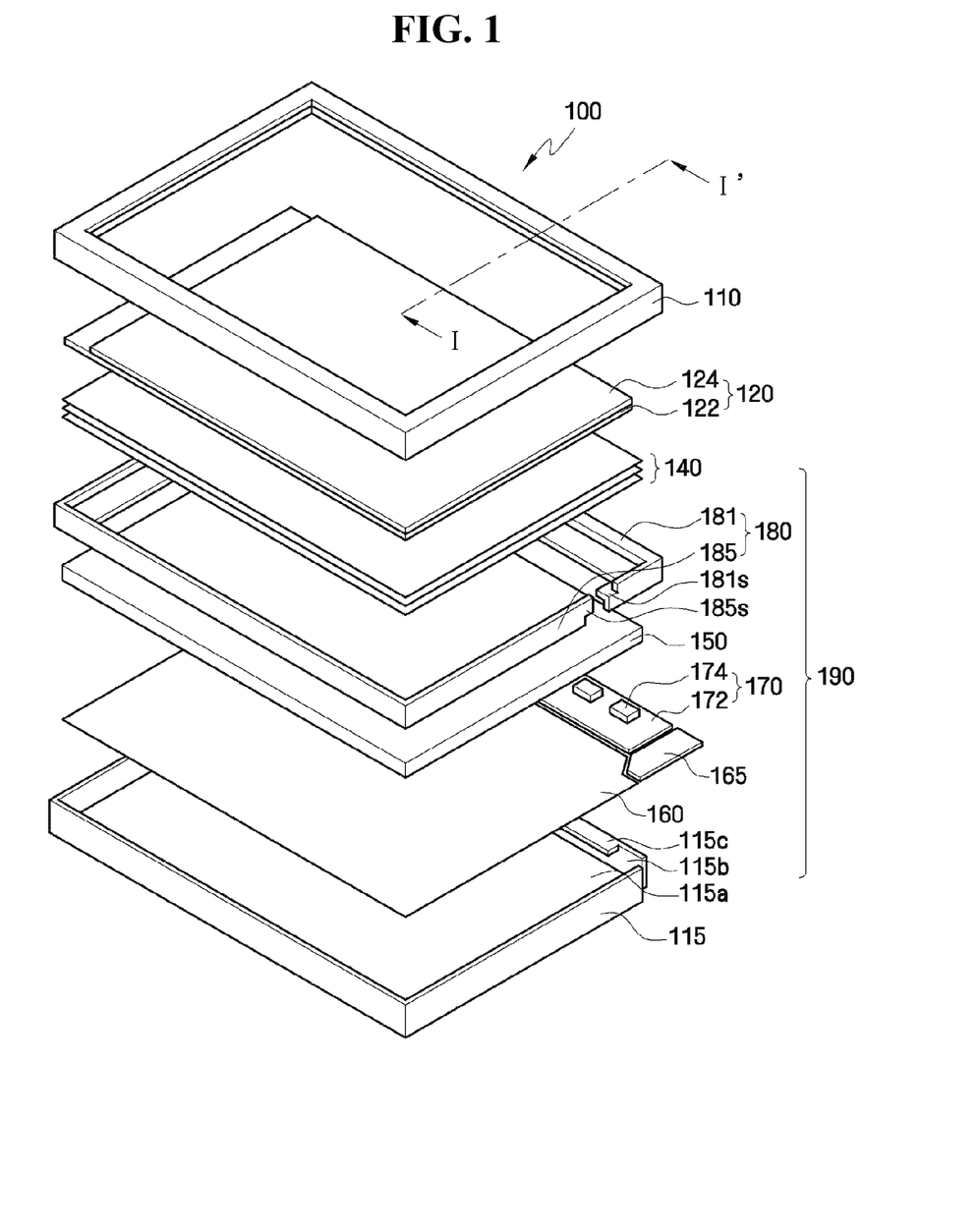
FIG. 1 is a perspective view of an exemplary embodiment of a display device according to the present invention.
Figure 2:
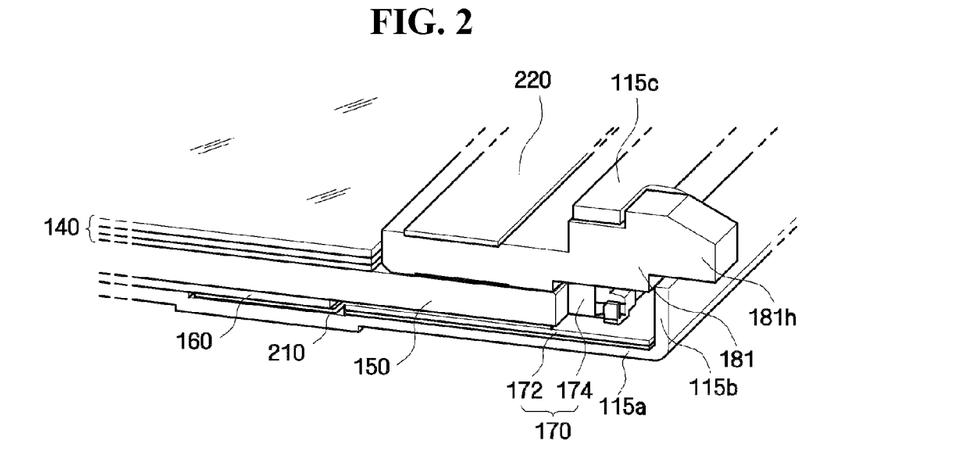
FIG. 2 is a cross-sectional view of an exemplary embodiment of a backlight assembly taken along line I-I' of FIG. 1.

First, an exemplary embodiment of a display device according to the present invention will be briefly described with reference to FIGS. 1 and 2. FIG. 1 is a perspective view of an exemplary embodiment of a display device 100 according to the present invention. FIG. 2 is a cross-sectional view of an exemplary embodiment of a backlight assembly 190 taken along line I-I' of FIG. 1.

Referring to FIG. 1, the current exemplary embodiment of a display device 100 may include an upper housing 110, a display panel 120, and the backlight assembly 190. The backlight assembly 190 may include optical sheets 140, a mold frame 180, a light guide plate ("LGP") 150, a light source unit 170, a reflective sheet 160, LGP fixing tapes 165 and a lower housing 115.

The display panel 120 includes a lower display panel 122 and an upper display panel 124 which faces the lower display panel 122. The lower display panel 122 includes gate lines (not shown), data lines (not shown), a thin-film transistor ("TFT") array, pixel electrodes, and various other similar components. The upper display panel 124 includes black matrices, common electrodes, and various other similar components. In some embodiments of the present invention, the black matrices and the common electrodes may be formed on the lower display panel 122. The display panel 120 may receive light from the light source unit 170 and thus display image information. In some embodiments of the present invention, a polarizing film (not shown) may be formed on each of an upper surface and a lower surface of the display panel 120.

The upper housing 110 may form the exterior of the display device 100 and have space in which the display panel 120 is accommodated. An open window may be formed in the center of the upper housing 110 to expose the display panel 120 therethrough. The upper housing 110 may be coupled to the lower housing 115.

The lower housing 115 may include a bottom portion 115a, sidewall portions 115b which extend from the bottom portion 115a in a vertical direction, and a top portion 115c which extends from part of a corresponding one of the sidewall portions 115b in a direction toward the inside of the lower housing 115 to be substantially perpendicular to the corresponding one of the sidewall portions 115b and substantially parallel to the bottom portion 115a. That is, the lower housing 115 may include a bent portion (115a through 115c) which extends from the bottom portion 115a to be bent in a sideways 'U' shape.

The bent portion (composed of the bottom portion 115a, the corresponding one of the sidewall portions 115b, and the top portion 115c) of the lower housing 115 may be formed in at least part of the lower housing 115. If the lower housing 115 has a rectangular shape as shown in the drawing, the bent portion 115a through 115c may be formed on at least one of four sides of the rectangular shape. For example, the bent portion may be formed on a side of the rectangular shape on which the light source unit 170 is placed. The mold frame 180, e.g., a portion of the mold frame 180 including a first mold frame 181, may be disposed in the recessed space formed by the bent portion of the lower housing 115.

The mold frame 180 may be interposed between the upper housing 110 and the lower housing 115 and accommodate the display panel 120 and the optical sheets 140. The mold frame 180 may include the first mold frame 181 and a second mold frame 185. The first mold frame 181 may be inserted into the recessed space formed by the bent portion (115a through 115c) of the lower housing 115. Specifically, the first mold frame 181 may slide into the space formed by the bent portion of the lower housing 115. The first mold frame 181 may fix the LGP 150 and a plurality of light source elements 174 in place from above as will be discussed in more detail below.

The second mold frame 185 may be formed in a shape to correspond to the first mold frame 181, e.g., the second mold frame may be formed in a sideways 'U' shape. Both ends of the second mold frame 185 may be coupled respectively to both ends of the first mold frame 181. The second mold frame 185 may be disposed along inner sidewalls of the lower housing 115. As shown in FIG. 1, both ends of the first mold frame 181 respectively include vertical stepped portions 181s, and both ends of the second mold frame 185 respectively include vertical stepped portions 185s, wherein the ends of the first mold frame 181 and the second mold frame 185 are formed to correspond. Both ends of the first mold frame 181 may engage with and thus be coupled to both ends of the second mold frame 185, which will be described in detail later with reference to FIG. 10.

The optical sheets 140 may diffuse and condense light transferred from the LGP 150. The optical sheets 140 may be disposed on the LGP 150 and may be housed within the upper and lower housings 110 and 115. The optical sheets 140 may include a first prism sheet, a second prism sheet, a protection sheet, and other similar components.

The first and second prism sheets improve the brightness of the display device 100 within an effective viewing angle range by refracting light transmitted through the LGP 150 and thus concentrating light incident thereupon at low angles on the front of the display device 100. The protection sheet formed on the first and second prism sheets protects the surface of the first and second prism sheets and diffuses light in order to make the light distribution uniform. The construction of the optical sheets 110 is not limited to that as described above, but can be diversely modified in accordance with the specification of the display device 100.

The LGP 150 is disposed within the lower housing 115 to be adjacent to the light source elements 174 and guides light emitted from the light source elements 174. The LGP 150 diffuses light from each of the light source elements 174 in a plurality of directions so that a bright line, which appears as a bright portion in accordance with the disposition of each of the light source elements 174, is not apparent as viewed from the front of the display device 100.

A side of the LGP 150 that is adjacent to the light source unit 170 may be fixed in place by the LGP fixing tapes 165 including first and second LGP fixing tapes 165a and 165b (as will be discussed in more detail with respect to FIG. 3). That is, the LGP 150 includes a light incident portion upon which light from the light source elements 174 is incident and an opposite portion which is positioned substantially opposite to the light incident portion. The first and second LGP fixing tapes 165a and 165b are interposed between the lower housing 115 and the LGP 150 at opposing ends of the light incident portion of the LGP 150 to fix the LGP 150 to the lower housing 115. Here, a part of the LGP 150 may be adhered to at least part of each of the LGP fixing tapes 165a and 165b.

Since a side of the LGP 150 that is adjacent to the light source unit 170 is fixed in place by the first and second LGP fixing tapes 165a and 165b, when the LGP 150 expands or contracts according to the ambient environment, e.g., temperature changes in the ambient environment, it does so such that the direction of movement is constrained to be in a direction away from, e.g., opposite to, the light source unit 170. Accordingly, the distance between the LGP 150 and the light source unit 170 can be maintained unchanged, thereby preventing problems with display quality, such as a reduction in luminance.

The light source unit 170 is disposed in the lower housing 115 and includes a circuit board 172 and the light source elements 174 mounted on a surface of the circuit board 172.

In one exemplary embodiment, the light source elements 174 may be point light sources such as light-emitting diodes ("LEDs"). The light source elements 174 may be arranged on a surface of the circuit board 172 in one direction to be separated from each other. The fact that the light source elements 174 are arranged in one direction denotes that the light source elements 174 are arranged such that they are predominately aligned in one direction. However, it does not denote that the light source elements 174 are arranged exactly in one line, e.g., that they are all aligned with one another. The light source elements 174 are not limited to point light sources, but can also be linear light sources such as closed cathode fluorescent tubes or other similar devices.

The circuit board 172 having the light source elements 174 mounted thereon may be disposed within the lower housing 115. That is, a lower surface of the circuit board 172 may contact an inner surface of the bottom portion 115a of the lower housing 115. For example, if the display device 100 includes the edge-type backlight assembly 190, the light source unit 170 may be disposed on a side of the lower housing 115 as shown in the drawing. In the present exemplary embodiment, the lower surface of the circuit board 172 may contact the inner surface of the bottom portion 115a of the lower housing 115, and the light source elements 174 may be mounted on the circuit board 172 and thus be electrically connected to the circuit board 172.

The reflective sheet 160 may be disposed under the LGP 150 and reflect light, which is emitted downward from the LGP 150 in an upward direction. The reflective sheet 160 may reduce light loss and improve uniformity of light incident upon the display panel 120. Exemplary embodiments include configurations wherein the reflective sheet 160 may be inserted into the lower housing 115 as a separate sheet. Alternative exemplary embodiments include configurations wherein a reflective pattern may be formed by coating a highly reflective material on the lower housing 115.

The first and second LGP fixing tapes 165a and 165b may be disposed respectively at both ends of the light source unit 170. As shown in FIG. 1, the first and second LGP fixing tapes 165a and 165b may be disposed side by side with the circuit board 172 of the light source unit 170 and the reflective sheet 160. In the present exemplary embodiment, when the first and second LGP fixing tapes 165a and 165b, the circuit board 172, and the reflective sheet 160 are disposed side by side, they are substantially in the same plane, e.g., they are disposed substantially a same height about the bottom portion of the lower housing 115a. The arrangement relationship between them will be described in more detail later with reference to FIGS. 3 through 7.

Referring to FIG. 2, the lower housing 115 may include the bottom portion 115a, the sidewall portions 115b, and the top portion 115c. The first mold frame 181 may be inserted into the space formed by the bent portion of the lower housing 115 (e.g., 115a through 115c). Here, the light source unit 170 and the LGP 150 may be placed within the lower housing 115, and the first mold frame 181 may fix the LGP 150 and the light source unit 170 in place from above.

One or more coupling holes may be formed in a region of the lower housing 115 where the corresponding one of the sidewall portions 115b and the top portion 115c contact each other, and coupling protrusions 181h corresponding respectively to the coupling holes may be formed on the first mold frame 181. Accordingly, the first mold frame 181 can be coupled to the lower housing 115 more securely. Although not shown in the drawings, one or more coupling protrusions may also be formed on the second mold frame 185, and the lower housing 115 may have coupling holes corresponding respectively to the coupling protrusions of the second mold frame 185. Accordingly, the second mold frame 185 can be coupled to the lower housing 115 more securely.

In some exemplary embodiments of the present invention, a reflective tape 210 may further be installed between the LGP 150 and the circuit board 172 to extend between the reflective sheet 160 and the lower housing 115. The reflective tape 210 may help light emitted from the light source elements 174 to be incident upon the LGP 150 and thereby improve the brightness and uniform intensity of the display device 100.

The first mold frame 181 may include an extension portion which protrudes further than an end of the top portion 115c of the lower housing 115 toward the inside of the lower housing 115. A panel cushion 220 may be formed on the extension portion so that the display panel 120 can be placed on the first mold frame 181 more stably.

Figure 4:
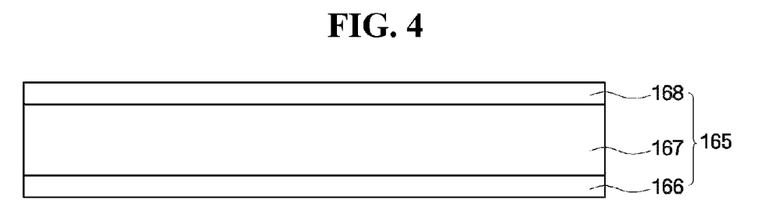
FIG. 4 is a cross-sectional view of one of the first and second LGP fixing tapes shown in FIG. 3.
Figure 5:
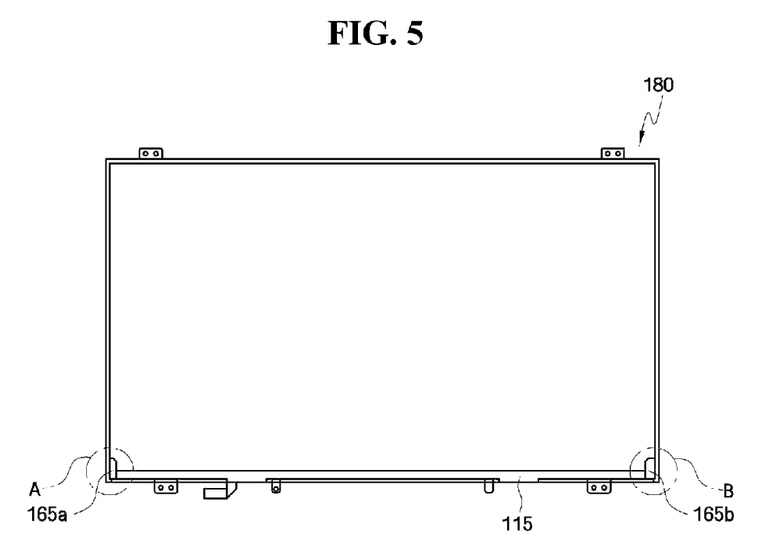
FIG. 5 is a top plan view showing the arrangement relationships between the lower housing, the light source unit, the first and second LGP fixing tapes, and the reflective sheet shown in FIG. 1.
Figure 6A:
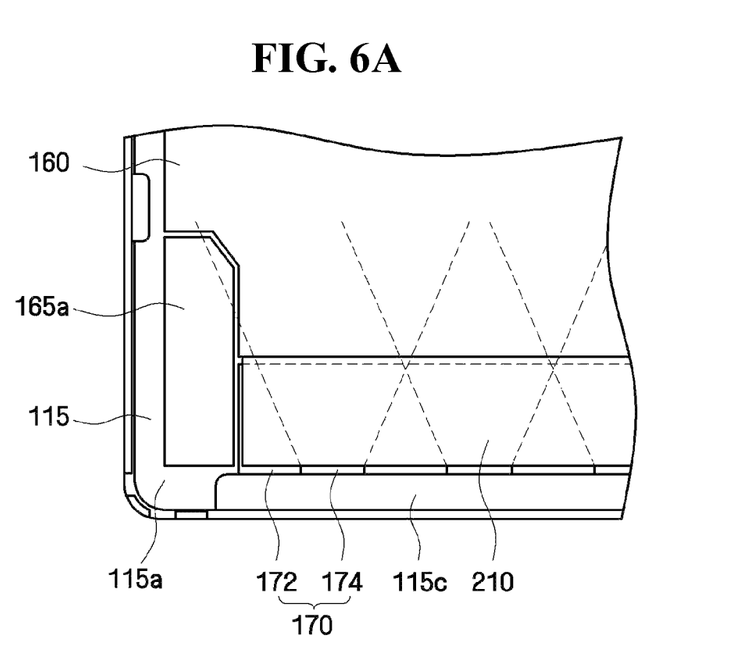
FIGS. 6A and 6B respectively are partial enlarged views of FIG. 5 illustrating the arrangement relationship between the light source unit and the first and second LGP fixing tapes respectively on the left and right sides of the light source unit.
Figure 6B:
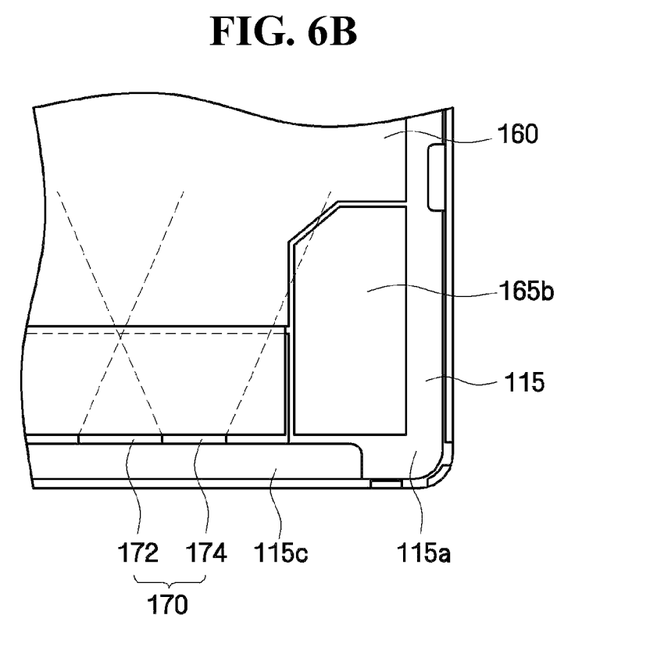
Figure 7:
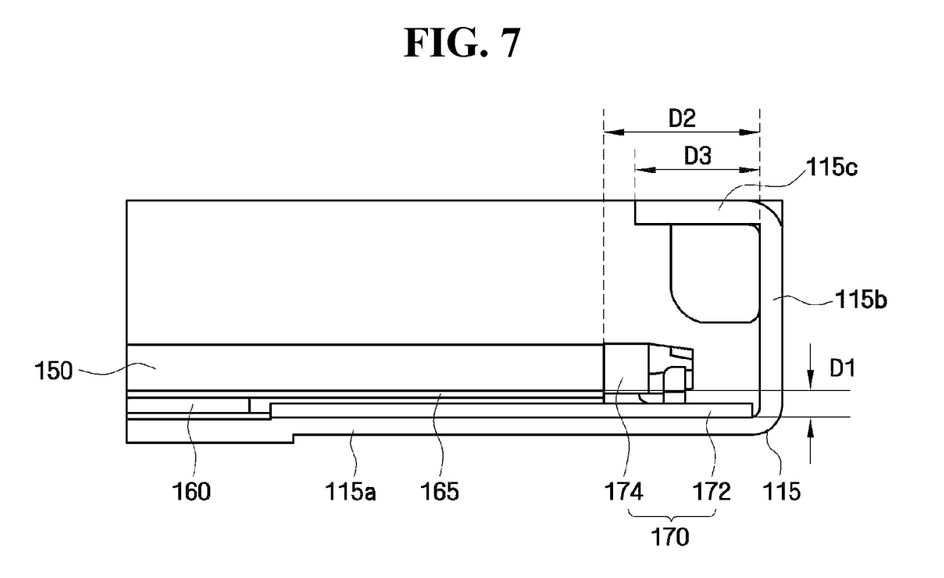
FIG. 7 is a lateral cross-sectional view showing the arrangement of the LGP and the light source unit within the lower housing.

The coupling relationships between the light source unit 170, the first and second LGP fixing tapes 165a and 165b, the LGP 150, and the lower housing 115 which form the backlight assembly 190 will now be described in detail with reference to FIGS. 3 through 7. FIG. 3 is a partial top plan view showing the arrangement relationships between the light source unit 170, the first and second LGP fixing tapes 165a and 165b, and the reflective sheet 160 in the lower housing 115 of FIG. 1. FIG. 4 is a cross-sectional view of the LGP fixing tape 165 shown in FIG. 3. FIG. 5 is a top plan view showing the arrangement relationships between the lower housing 115, the light source unit 170, the first and second LGP fixing tapes 165a and 165b, and the reflective sheet 160 shown in FIG. 1. FIGS. 6A and 6B respectively are partial enlarged views of FIG. 5 illustrating the arrangement relationship between the light source unit 170 and the first and second LGP fixing tapes 165a and 165b respectively on the left and right of the light source unit 170. FIG. 7 is a lateral cross-sectional view showing the arrangement of the LGP 150 and the light source unit 170 within the lower housing 115.

Figure 3:
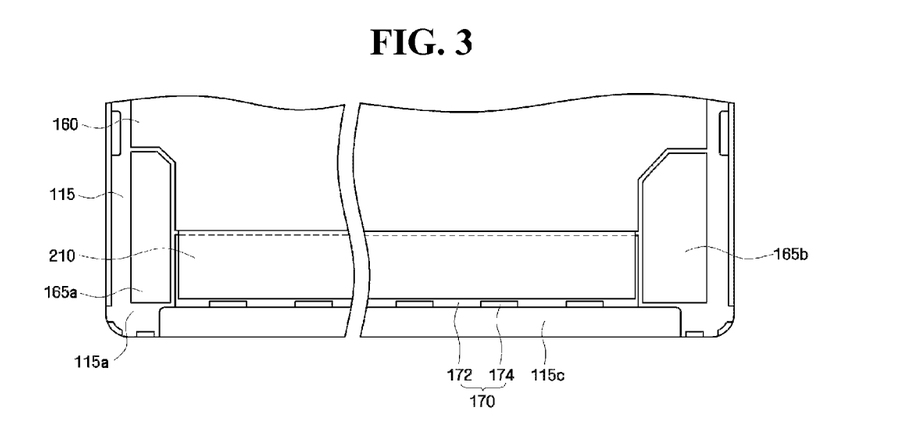
FIG. 3 is a partial top plan view showing the arrangement relationships between an exemplary embodiment of a light source unit, first and second light guide plates ("LGPs") fixing tapes, and a reflective sheet in a lower housing of FIG. 1.

Referring to FIG. 3, the circuit board 172 having the light source elements 174 mounted thereon is disposed on the inner surface of the bottom portion 115a of the lower housing 115, and the first and second LGP fixing tapes 165a and 165b are disposed respectively at both ends of the circuit board 172 of the light source unit 170. In view of a region of the inner surface of the bottom portion 115 in which the circuit board 172 and the first and second LGP fixing tapes 165a and 165b are disposed, the reflective sheet 160 may be disposed in the other region of the inner surface of the bottom portion 115a of the lower housing 115. Here, 'the other region' of the inner surface of the bottom portion 115a may denote a region suitable for disposition of the reflective sheet 160 in view of regions that receive light emitted from the light source elements 174. The other region of the inner surface of the bottom portion 115a does not necessarily denote 'all regions' of the inner surface of the bottom portion 115a in which the circuit board 172 and the first and second LGP fixing tapes 165a and 165b are not disposed.

That is, referring to FIG. 3, a portion of the inner surface of the bottom portion 115a of the lower housing 115 may be externally exposed by, e.g., not covered by, the reflective sheet 160 and the first and second LGP fixing tapes 165a and 165b. The width and area of the portion of the inner surface of the bottom portion 115a which is exposed by the reflective sheet 160, the first and second LGP fixing tapes 165a and 165b, and the circuit board 172 may be determined in view of the LGP 150 or the mold frame 180 disposed within the lower housing 115.

In some exemplary embodiments of the present invention, the reflective tape 210 may further be installed. The reflective tape 210 may be disposed on the circuit board 172 and extend to under the reflective sheet 160, that is, extend to be between the reflective sheet 160 and the lower housing 115 such that there are no gaps in coverage between the reflective tape 210 and the reflective sheet 160.

Referring to FIG. 4, exemplary embodiments include configurations wherein each of the LGP fixing tapes 165 may consist of multiple layers of films. For example, in one exemplary embodiment each of the LGP fixing tapes 165 may include a base film 167 and adhesive films 166 and 168 formed respectively on lower and upper surfaces of the base film 167. The reflectivity of light incident on each of the LGP fixing tapes 165 can be adjusted by changing the reflectivity of the base film 167. For example, the luminance of a region around each of the LGP fixing tapes 165 can be controlled by adjusting the color of the base film 167.

The LGP fixing tapes 165 are disposed respectively in corner regions at both ends of the light incident portion of the LGP 150. Accordingly, the LGP fixing tapes 165 do not block light emitted from the light source elements 174 while allowing the light to be scattered therefrom into the light guide plate 150. The LGP fixing tapes 165 can adjust the amount of light that leaks at corners of the LGP 150 due to the scattering of the light within the LGP 150.

The shape and size of each of the first and second LGP fixing tapes 165a and 165b will now be described with reference to FIGS. 5 through 6B.

FIG. 5 is a top plan view showing the arrangement relationship between the lower housing 115 and the first and second LGP fixing tapes 165a and 165b. FIGS. 6A and 6B respectively are enlarged views of regions A and B shown in FIG. 5.

Referring to FIGS. 5 through 6B, the first and second LGP fixing tapes 165a and 165b may be disposed on the inner surface of the bottom portion 115a of the lower housing 115. For example, lower surfaces of the first and second LGP fixing tapes 165a and 165b may be adhered directly to the inner surface of the bottom portion 115a of the lower housing 115, and upper surfaces of the first and second LGP fixing tapes 165a and 165b may be adhered directly to the LGP 150.

As described above, each of the first and second LGP fixing tapes 165a and 165b has adhesive films formed respectively on the upper and lower surfaces thereof. Thus, the first and second LGP fixing tapes 165a and 165b can function as double-sided adhesive tapes. The first and second LGP fixing tapes 165a and 165b may be adhered to the lower housing 115 and the LGP 150 which will be disposed thereon. That is, the lower surfaces of the first and second LGP fixing tapes 165a and 165b may be adhered to the lower housing 115, and the upper surfaces of the first and second LGP fixing tapes 165a and 165b may be adhered to the LGP 150. Accordingly, the LGP 150 can be fixed into the lower housing 115 and held in position by the first and second LGP fixing tapes 165a and 165b.

Referring to FIGS. 6A and 6B, the first and second LGP fixing tapes 165a and 165b may be disposed to not block light output from the light source elements 174. Specifically, each of the first and second LGP fixing tapes 165a and 165b may have a chamfered corner. The fact that each of the first and second LGP fixing tapes 165a and 165b has a chamfered corner denotes that the shape of each of the first and second LGP fixing tapes 165a and 165b is determined in view of active regions defined by light output from the light source elements 174, e.g., regions indicated by dotted lines extending from the light source elements 174.

For example, referring to FIG. 6A, an upper right corner of the first LGP fixing tape 165 a may be chamfered in view of the outline of an active region defined by light output from the leftmost one of the light source elements 174 as illustrated by the dotted lines. Likewise, referring to FIG. 6B, an upper left corner of the second LGP fixing tape 165b may be chamfered in view of the outline of an active region defined by light output from the rightmost one of the light source elements 174. In some embodiments of the present invention, some portions of the first and second LGP fixing tapes 165a and 165b overlaps with the active region. Specifically, the chamfered corners reduce the total area of the first and second LGP fixing tapes 165a and 165b within the active regions, even in embodiments where it does not completely remove all overlap.

Each of the first and second LGP fixing tapes 165a and 165b may be disposed outside the active region defined by light output from the leftmost or rightmost one of the light source elements 174. The exemplary embodiments of the first and second LGP fixing tapes 165a and 165b shown in the drawings have different widths. However, alternative exemplary embodiments include configurations wherein they may have the same width.

The arrangement relationship between the light source unit 170 and the lower housing 115 will now be described with reference to FIG. 7.

Referring to FIG. 7, as described above, the light source unit 170 may be disposed on the side of the incident portion of the LGP 150, and the lower housing 115 may include the bottom portion 115a, the sidewall portions 115b, and the top portion 115c. Here, a first distance D3 between the an inner sidewall of the corresponding one of the sidewall portions 115b of the lower housing 115 and an end of the top portion 115c of the lower housing 115 may be smaller than a second distance D2 between the inner sidewall of the corresponding one of the sidewall portions 115b of the lower housing 115 and an end of each of the light source elements 174 of the light source unit 170, the end of the light source element being the side which faces the LGP 150.

That is, the lower housing 115 may include the bent portion (115a through 115c) which extends from the bottom portion 115a to be which is bent in a sideways 'U' shape. Here, an end of each of the light source elements 174 of the light source unit 170 on the side of the LGP 150 may protrude further toward the inside of the lower housing 115 than an end of the bent portion.

Accordingly, when the LGP 150 is adhered onto the LGP fixing tapes 165, the distance between the LGP 150 and the light source elements 174 can be checked with the naked eye. Thus, the distance between the LGP 150 and the light source elements 174 can be adjusted more accurately. As described above, the LGP fixing tapes 165 are disposed between the lower housing 115 and the LGP 150 at both ends of the light incident portion of the LGP 150, thereby fixing the light incident portion of the LGP 150 in place. When the light incident portion of the LGP 150 is fixed in place by the LGP fixing tapes 165, the change in distance between the LGP 150 and the light source elements 174 can be minimized, as compared with when the opposite portion of the LGP 150 is fixed in place by the LGP fixing tapes 165.

That is, an end of each of the light source elements 174 on the side of the LGP 150 protrudes further toward the inside of the lower housing 115 than an end of the bent portion (115a through 115c) of the lower housing 115. Thus, a manufacturer can install the LGP 150 while checking the distance between the light source elements 174 and the LGP 150 with the naked eye. In one exemplary embodiment, the distance between the light source elements 174 and the LGP 150 may be zero, that is, they may be in direct contact.

Furthermore, since the LGP fixing tapes 165 are disposed respectively on both sides of the circuit board 172 of the light source unit 170, they fix the light incident portion of the LGP 150 in place. Accordingly, when the LGP 150 expands or contracts according to the ambient environment (e.g., temperature changes), it does so in a direction extending toward the opposite portion of the LGP, not toward the light incident portion which is fixed in place by the LGP fixing tapes 165. Thus, the distance between the light incident portion of the LGP 150 and a light output portion of each of the light source elements 174 can be maintained substantially unchanged, thereby preventing problems with display quality, such as a reduction in luminance.

Referring back to FIG. 7, each of the LGP fixing tapes 165 may be formed to a thickness somewhere between or equal to a distance D1 between the inner surface of the bottom portion 115a of the lower housing 115 and the lower surface of the LGP 150. In some exemplary embodiments, the thickness of each of the LGP fixing tapes 165 may be greater than a first thickness between the inner surface of the bottom portion 115a of the lower housing 115 and an upper surface of the circuit board 172 of the light source unit 170. In some exemplary embodiments, the thickness of each of the LGP fixing tapes 165 may be greater than a second thickness between the inner surface of the bottom portion 115a of the lower housing 115 and an upper surface of the reflective sheet 160.

Figure 8A:
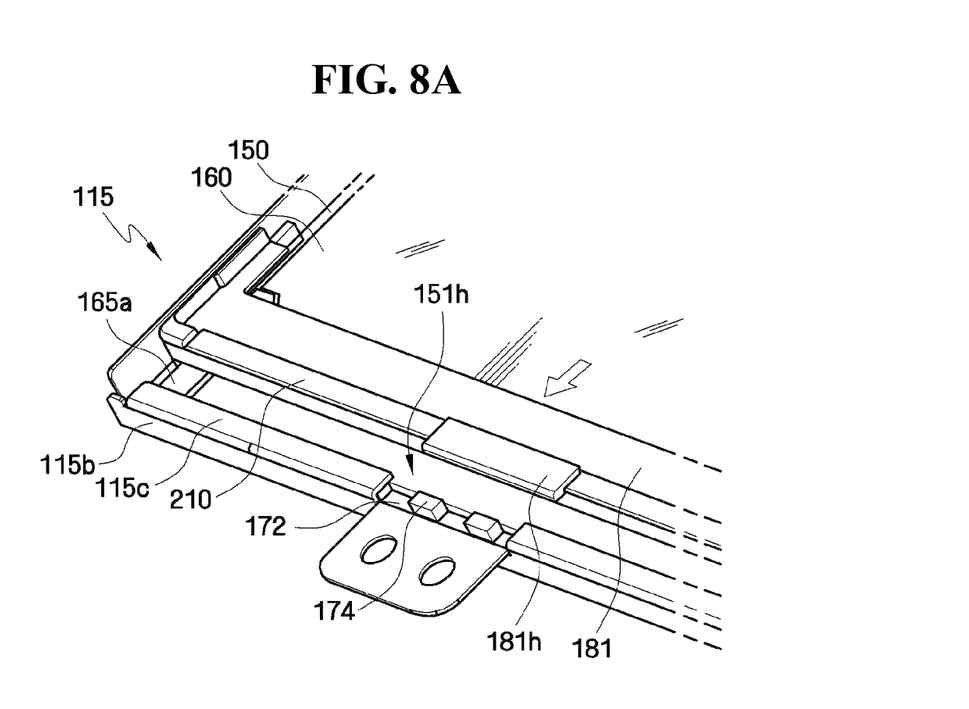
FIGS. 8A and 8B are partial perspective views showing the coupling structure of the lower housing and a first mold frame shown in FIG. 1.
Figure 8B:
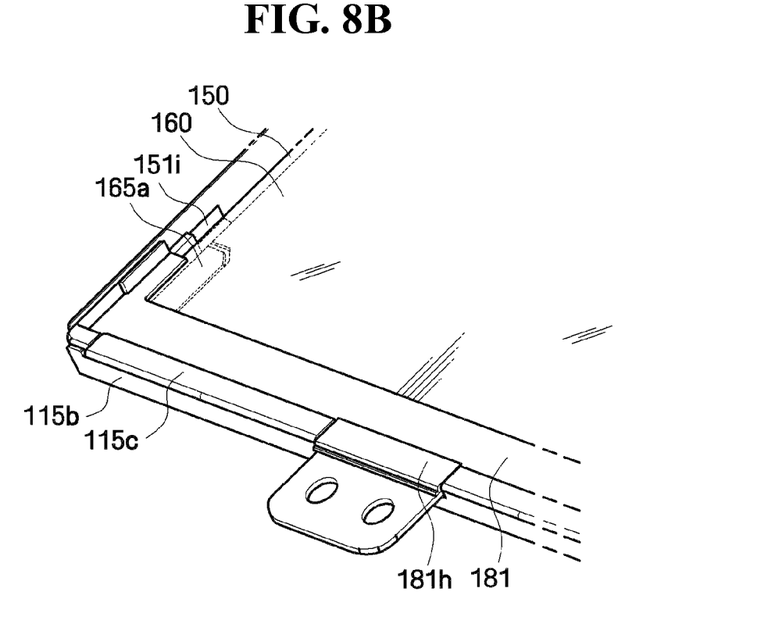

The coupling structure of the lower housing 115 and the first mold frame 181 will now be described in detail with reference to FIGS. 8A and 8B. FIGS. 8A and 8B are partial perspective views showing the coupling structure of the lower housing 115 and the first mold frame 181 shown in FIG. 1.

Referring to FIGS. 8A and 8B, the first mold frame 181 may slide into the space formed by the bent portion (115a through 115c) of the lower housing 115. That is, the first mold frame 181 may be installed such that a sidewall of the first mold frame 181 contacts a corresponding one of the sidewall portions 115b of the lower housing 115. When the corresponding one of the sidewall portions 115b of the lower housing 115 and the sidewall of the first mold frame 181 contact each other, they may contact each other along substantially their entire surface areas with substantially no gap between them since they are placed very close to each other.

As shown in the drawings, the top portion 115c of the lower housing 115 may include one or more apertures 151h which are coupled and thus fixed respectively to the coupling protrusions 181h of the first mold frame 181. Also, the corresponding one of the sidewall portions 115b of the lower housing 115 may include one or more coupling holes 151i which are coupled respectively to coupling hooks of the first mold frame 181.

Since the first mold frame 181 is coupled to the lower housing 115 in a sliding manner, the assembling process of the display device 100 can be simplified. In addition, since the lower housing 115 and the first mold frame 181 are coupled to each other more securely by the coupling of the apertures 151h to the coupling protrusions 181h of the first mold frame 181, they can be prevented from being separated from each other in a reverse direction.

Figure 9:
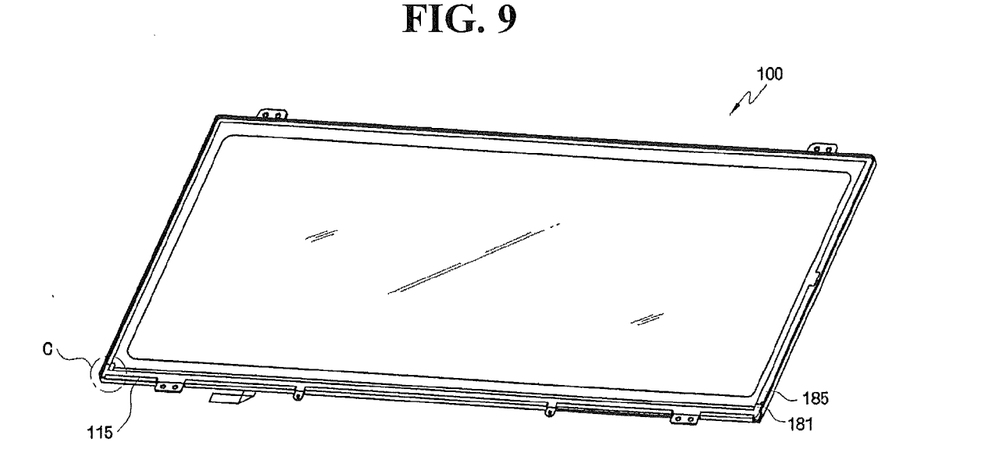
FIG. 9 is a perspective view showing the first mold frame, a second mold frame, and the lower housing which are coupled to each other.
Figure 10:
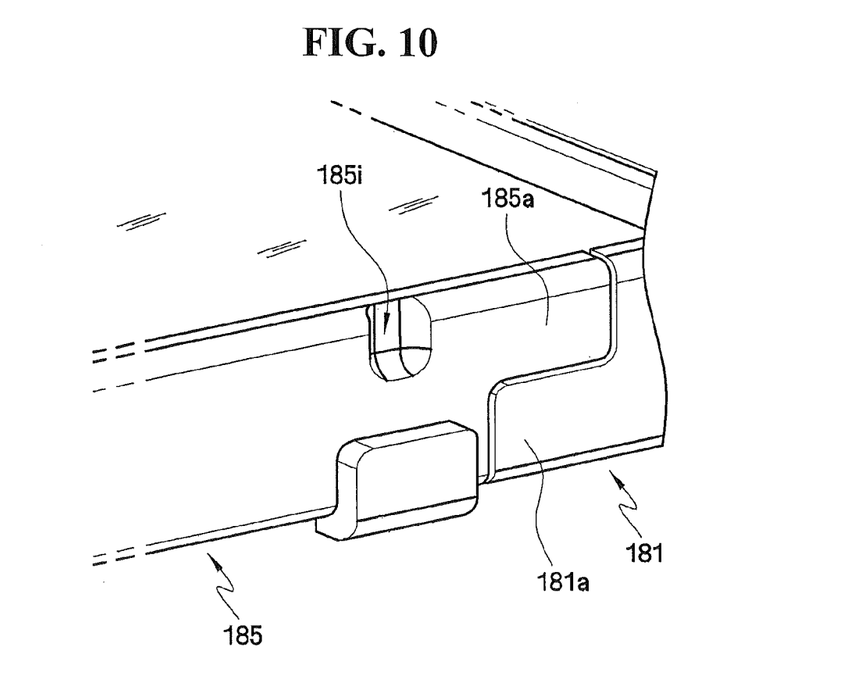
FIG. 10 is a partial perspective view showing the coupling relationship between the first mold frame and the second mold frame.

The coupling relationships between the first mold frame 181, the second mold frame 185, and the lower housing 115 will now be described in more detail with reference to FIGS. 9 and 10. FIG. 9 is a perspective view showing the first mold frame 181, the second mold frame 185, and the lower housing 115 which are coupled to each other. FIG. 10 is a partial perspective view showing the coupling relationship between the first mold frame 181 and the second mold frame 185.

Referring to FIG. 9, the first and second mold frame 181 and 185 may be coupled to each other, thereby forming the mold frame 180. Specifically, the first mold frame 181 may be disposed on a side of the display device 100 on which the light source unit 170 (see FIG. 7) is disposed. In addition, the second mold frame 185 may be disposed along the inner sidewalls of the lower housing 115. Both ends of the second mold frame 185 may be coupled respectively to both ends of the first mold frame 181, thereby completing the formation of the mold frame 180.

Referring to FIG. 10, both ends of the first mold frame 181 may respectively include the vertical stepped portions 181a, and both ends of the second mold frame 185 may respectively include the vertical stepped portions 185a. That is, the vertical stepped portions 181a of the first mold frame 181 may engage with and thus be coupled to the vertical stepped portions 185a of the second mold frame 185, respectively. Alternative exemplary embodiments include configurations wherein the orientation of the vertical stepped portions 181a and 185a are reversed.

An upper region of each of the vertical stepped portions 181a at both ends of the first mold frame 181 may be shorter than a lower region thereof. Thus, two of outer sidewalls of the first mold frame 181 which contact corresponding two of the inner sidewalls of the lower housing 115 may be formed in a 'L' shape. Accordingly, an upper region of each of the vertical stepped portions 185a at both ends of the second mold frame 185 may be longer than a lower region thereof. Thus, two of outer sidewalls of the second mold frame 185 which contact corresponding two of the inner sidewalls of the lower housing 115 may be formed in an upside-down 'L' shape. The vertical stepped portions 181a of the first mold frame 181 and the vertical stepped portions 185a of the second mold frame 185 which correspond respectively to the vertical stepped portions 181a of the first mold frame 181 may engage with each other, e.g., they correspond to one another.

That is, each of the vertical stepped portions 181a of the first mold frame 181 includes a first protrusion in the lower region thereof which extends longer than the upper region thereof, and each of the vertical stepped portions 185 of the second mold frame 185 includes a second protrusion in the upper region thereof which extends longer than the lower region thereof. The first protrusion and the second protrusion overlap each other, thereby fixing the first and second mold frames 181 and 185 onto the lower housing 115.

An exemplary embodiment wherein each of the vertical stepped portions 181a of the first mold frame 181 has a protruding lower region and where each of the vertical stepped portions 185a of the second mold frame 185 has a protruding upper region has been described above by way of example. However, the present invention is not limited to this example. That is, both ends of the first mold frame 181 may have protruding upper regions, and both ends of the second mold frame 185 may have protruding lower regions as described briefly above. Also, any one of both ends of the first mold frame 181 may include a protruding upper region, and the other end of the first mold frame 181 may have a protruding lower region. Accordingly, any one of both ends of the second mold frame 185 which correspond respectively to both ends of the first mold frame 181 may have a protruding lower region, and the other end of the second mold frame 185 may have a protruding upper region. Alternative exemplary embodiments include configurations wherein the vertical stepped portions 181a and 185a can have any protruding shape as long as the first mold frame 181 and the second mold frame 185 can engage with each other and thus can be coupled to each other.

In some exemplary embodiments, a separation hole 185i may be formed at a specified position in the second mold frame 185. The separation hole 185i enables the second mold frame 185 to be separated from the first mold frame 181 more easily.

In exemplary embodiments of a backlight assembly and a display device having the same according to the present invention, an LGP fixing tape is disposed on at least one side of an LGP, thereby securely fixing the LGP in place. In addition, a mold frame is manufactured as two parts, i.e., a first frame and a second frame. The first mold frame is coupled to a lower housing in a sliding manner, thereby fixing a light source unit and the LGP in place from above. The second mold frame fixes the whole of the LGP in place. Since the first and second mold frames engage with each other, they are prevented from being separated from each other in a direction opposite to a direction in which they were assembled.

Furthermore, since the LGP fixing tape is placed on the light incident portion side of the LGP, the distance between the LGP and the light source unit can be maintained unchanged even when the LGP expands or contracts due to changes in the ambient environment, and the LGP and the light source unit can be arranged as close to each other as possible. In addition, a relatively short end of a top portion of the lower housing enables a manufacturer to assemble the display device while checking the distance between the LGP and the light source unit with the naked eye, thereby significantly improving assembling efficiency.

The size and shape of the LGP fixing tape are adjusted such that the LGP fixing tape disposed in a corner region at an end of the light incident portion of the LGP does not block light emitted from light source elements while also causing scattering of the light. Accordingly, light leakage at a corner of the LGP may be prevented. Luminance of a dark portion which may be created at the corner of the LGP can be improved by adjusting the amount of light that leaks at the corner of the LGP, for example, by selecting an appropriate base film for the LGP fixing tape, e.g., a reflective base film.

Figure 11A:
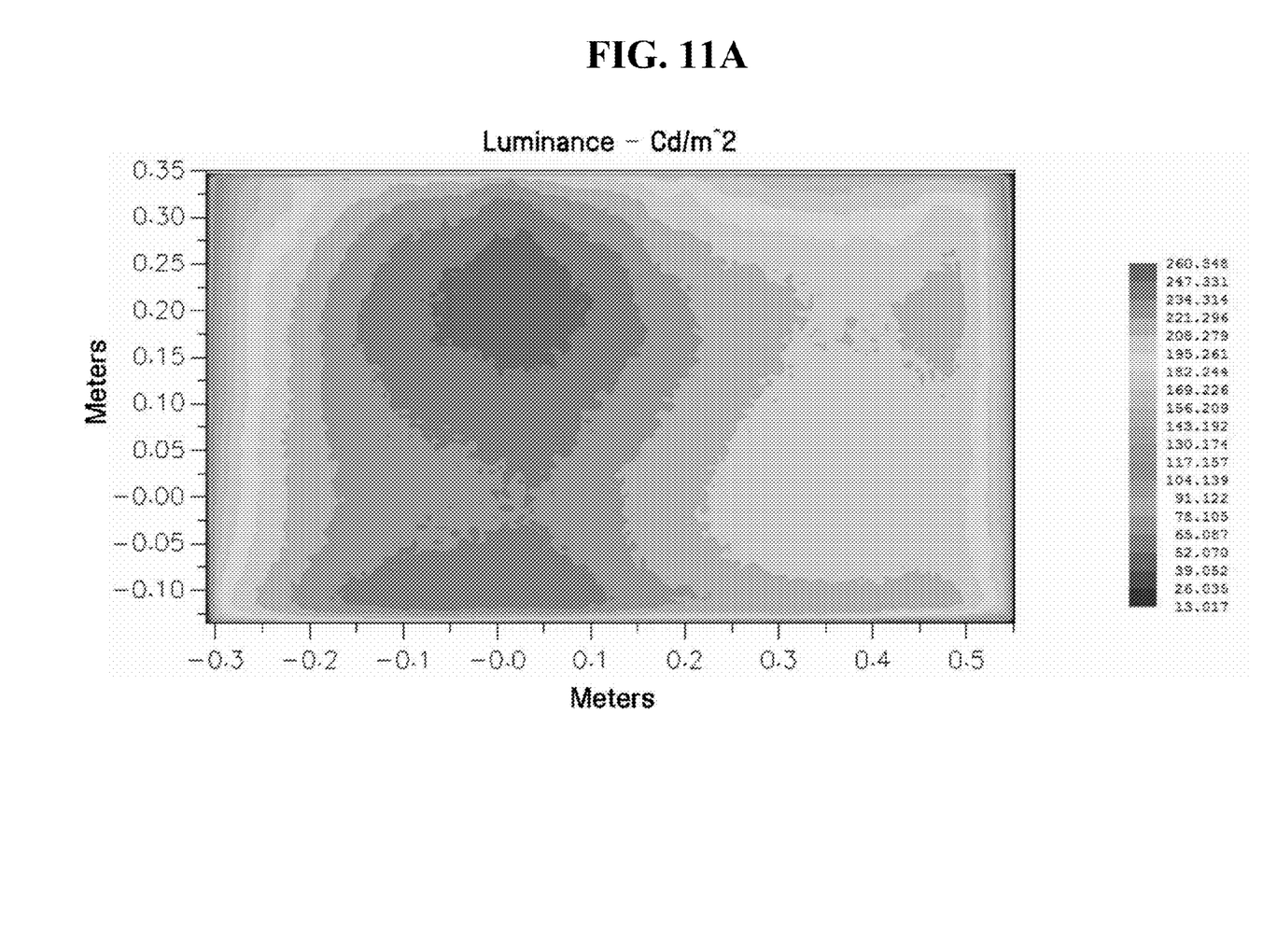
FIG. 11A is a graph illustrating luminance distribution in an exemplary embodiment when an LGP fixing tape was used.
Figure 11B:
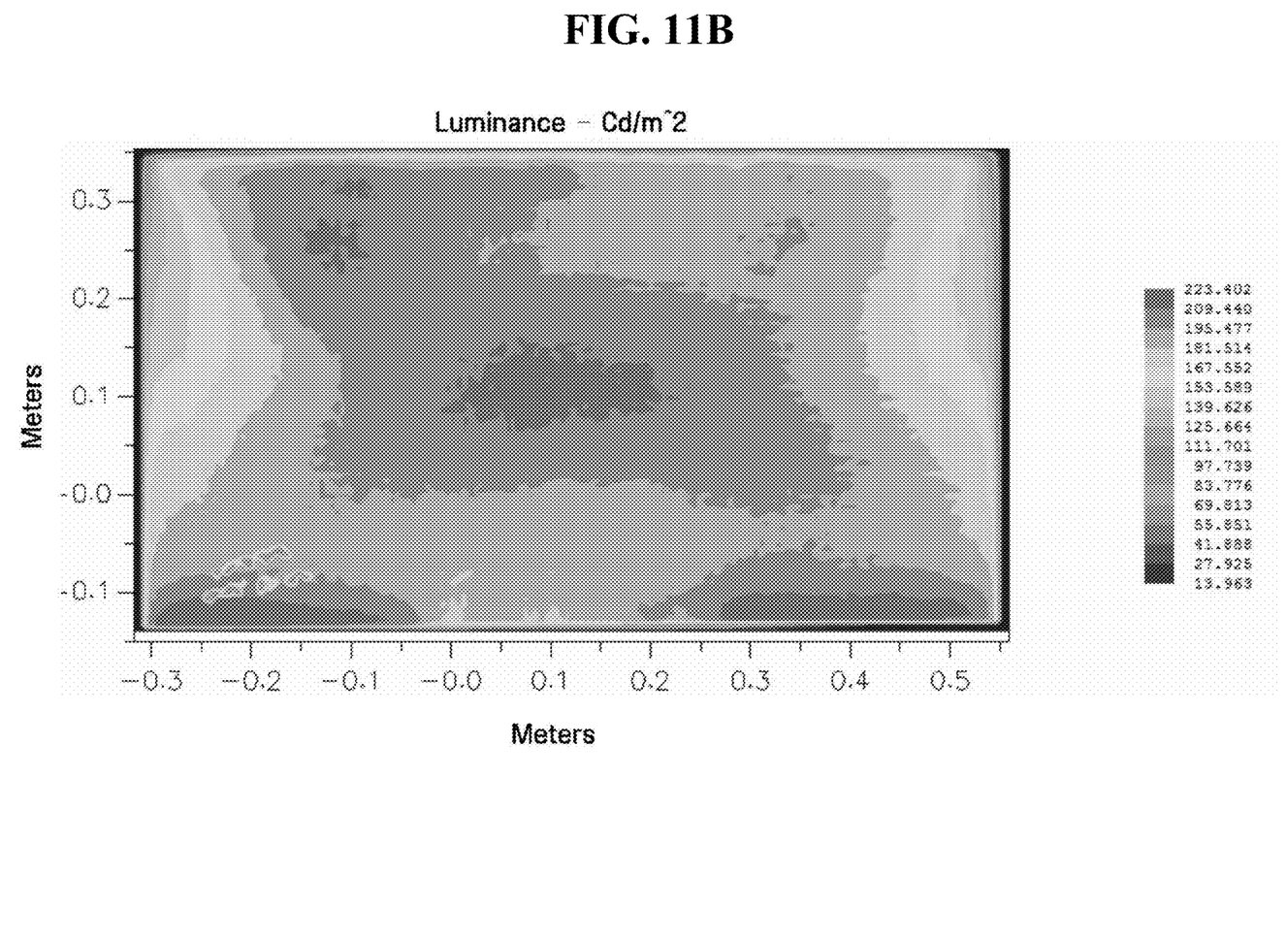
FIG. 11B is a graph illustrating luminance distribution in a comparative embodiment when an LGP fixing tape was not used.

The distribution of luminous and dark portions of an exemplary embodiment of a display device according to the present invention will now be described with reference to FIGS. 11A and 11B. FIG. 11A is a graph illustrating a luminance distribution when an LGP fixing tape was used. FIG. 11B is a graph illustrating luminance distribution when the LGP fixing tape was not used. The luminance distribution was measured using Prometric measurement equipment. The light source elements are disposed in the upper part of each drawing.

Referring to FIGS. 11A and 11B, the presence of the LGP fixing tape increased luminance of corner regions, which are seen as dark portions in FIG. 11B. In addition, the maximum measured luminance was 260.348 Cd/m$^2$ in the case of FIG. 11A where the LGP fixing tape was used, whereas the maximum measured luminance was 223.402 Cd/m$^2$ in the case of FIG. 11B where the LGP fixing tape was not used. That is, it can be understood that the LGP fixing tape increases luminance. This is because the LGP fixing tape not only maintains a constant distance between the LGP and the light source elements but also makes the LGP and the light source elements be disposed as close to each other as possible, thereby improving light incidence efficiency.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A backlight assembly comprising:
 a light guide plate comprising a light incident portion upon which light is incident and an opposite portion which is disposed substantially opposite the light incident portion;
 a lower housing which accommodates the light guide plate therein;
 light guide plate fixing tapes which fix the light guide plate into the lower housing; and
 a light source unit adjacent to the light incident portion of the light guide plate, the light source unit comprising a circuit board, and at least one light source element on the circuit board,
 wherein
 the light guide plate fixing tapes are interposed between the lower housing and lower surfaces of two opposite ends of the light incident portion of the light guide plate, and an entire of the light guide fixing tapes is outside the circuit board of the light source unit, in a plan view,
 wherein a lower surface of the light guide plate fixing tapes is only adhered directly to the lower housing, and an upper surface of the light guide plate fixing tapes is only adhered directly to the light guide plate.

2. The backlight assembly of claim 1, wherein the lower housing comprises:
 a bottom portion,
 sidewall portions which extend from the bottom portion in a vertical direction substantially normal to a surface of the bottom portion, and
 a top portion which extends from a corresponding one of the sidewall portions in a direction substantially perpendicular to the corresponding one of the sidewall portions,
 wherein a first distance between the corresponding one of the sidewall portions of the lower housing and an end of the top portion is smaller than a second distance between the corresponding one of the sidewall portions of the lower housing and an end of the at least one light source element of the light source unit, and
 wherein the end of the at least one light source element is adjacent to the light guide plate.

3. The backlight assembly of claim 1, wherein the lower housing comprises:
 a bottom portion, and
 a bent portion which extends from the bottom portion to be bent in a sideways U shape and has an end extending toward the inside of the lower housing,
 wherein an end of the at least one light source element of the light source unit adjacent to the light guide plate protrudes further toward the inside of the lower housing than the end of the bent portion which extends toward the inside of the lower housing.

4. The backlight assembly of claim 3, further comprising a first mold frame inserted into the bent portion of the lower housing,
 wherein the first mold frame fixes the light guide plate and the light source elements in place from above.

5. The backlight assembly of claim 4, further comprising a second mold frame formed in a sideways U shape,
 wherein the second mold frame has two opposing ends coupled respectively to two opposing ends of the first mold frame and is formed along inner sidewalls of the lower housing.

6. The backlight assembly of claim 5,
 wherein each of the first mold frame and the second mold frame comprises vertical stepped portions, and
 wherein the vertical stepped portions of the first mold frame engage with the vertical stepped portions of the second mold frame, respectively.

7. The backlight assembly of claim 1, wherein the light guide plate fixing tapes are disposed outside an active region defined by light output from each light source element.

8. The backlight assembly of claim 1, wherein a thickness of the light guide plate fixing tapes are somewhere between or equal to a distance between an inner surface of the bottom portion of the lower housing and a lower surface of the light guide plate.

9. The backlight assembly of claim 1, further comprising a reflective sheet disposed between the light guide plate and the lower housing,
wherein the reflective sheet is disposed in substantially a same plane as the circuit board of the light source unit.

10. The backlight assembly of claim 9, wherein a thickness of the light guide plate fixing tapes is greater than a first thickness between an inner surface of the bottom portion of the lower housing and an upper surface of the circuit board of the light source unit and a second thickness between the inner surface of the bottom portion of the lower housing and an upper surface of the reflective sheet.

11. The backlight assembly of claim 1, wherein the light guide plate fixing tapes are a double-sided adhesive tape having a base film, and adhesive films which are disposed respectively on an upper surface of the base film and a lower surface of the base film.

12. A backlight assembly comprising:
a light source unit comprising a circuit board, and at least one light source element mounted on the circuit board;
a light guide plate fixing tape disposed at opposing ends of the light source unit;
a light guide plate disposed adjacent to the at least one light source element on the circuit board, wherein the light guide plate guides light emitted from the at least one light source element; and
a lower housing which accommodates the light source unit and the light guide plate therein,
wherein
the light guide plate fixing tape is disposed between the lower housing and the light guide plate, and fixes the light incident portion of the light guide plate in place;
part of the light guide plate is adhered to at least part of the light guide plate fixing tape, and an entire of the light guide fixing tape is outside the circuit board of the light source unit, in a plan view, and
a lower surface of the light guide plate fixing tapes is only adhered directly to the lower housing, and an upper surface of the light guide plate fixing tapes is only adhered directly to the light guide plate.

13. The backlight assembly of claim 12, wherein
the light guide plate has a light incident portion upon which light is incident, and an opposite portion which is disposed substantially opposite the light incident portion, and
the light guide plate fixing tape is disposed at two opposing ends of the light incident portion of the light guide plate, and the light guide plate fixing tape is disposed in substantially a same plane as the circuit board.

14. The backlight assembly of claim 12, wherein the lower housing comprises:
a bottom portion,
sidewall portions which extend from the bottom portion in a vertical direction substantially normal to the bottom portion, and
a top portion which extends from a corresponding one of the sidewall portions in a direction substantially perpendicular to the corresponding one of the sidewall portions,
wherein a first distance between the corresponding one of the sidewall portions of the lower housing and an end of the top portion is smaller than a second distance between the corresponding one of the sidewall portions of the lower housing and an end of the at least one light source element of the light source unit, and
wherein the end of the at least one light source element is adjacent to the light guide plate.

15. The backlight assembly of claim 14, further comprising:
a first mold frame inserted into a space formed by the corresponding one of the sidewall portions and the top portion, wherein the mold frame fixes the light guide plate and the at least one light source element in place from above; and
a second mold frame formed in a sideways U shape along inner sidewalls of the lower housing and having opposing ends thereof coupled respectively to opposing ends of the first mold frame.

16. The backlight assembly of claim 12, further comprising a reflective sheet disposed between the light guide plate and the lower housing in substantially a same plane as the circuit board of the light source unit,
wherein a thickness of the light guide plate fixing tape is greater than a first thickness between an inner surface of the bottom portion of the lower housing and an upper surface of the circuit board of the light source unit and a second thickness between the inner surface of the bottom portion of the lower housing and an upper surface of the reflective sheet.

17. A display device comprising:
a light guide plate having a light incident portion upon which light is incident and an opposite portion which is disposed substantially opposite to the light incident portion;
a light source unit adjacent to the light incident portion of the light guide plate, the light source unit comprising a circuit board, and at least one light source element on the circuit board;
a lower housing which accommodates the light guide plate therein;
a backlight assembly having a light guide plate fixing tape which fixes the light guide plate into the lower housing; and
a display panel which receives light from the backlight assembly,
wherein
the light guide plate fixing tape is interposed between the lower housing and lower surfaces of opposing ends of the light incident portion of the light guide plate, and
an entire of the light guide fixing tape is outside the circuit board of the light source unit, in a plan view,
wherein a lower surface of the light guide plate fixing tapes is only adhered directly to the lower housing, and an upper surface of the light guide plate fixing tapes is only adhered directly to the light guide plate.

* * * * *